(12) United States Patent
Korhonen et al.

(10) Patent No.: US 7,667,878 B2
(45) Date of Patent: Feb. 23, 2010

(54) CVT DOCUMENT SCANNER CONTAMINATION DIAGNOSTIC ROUTINE

(75) Inventors: John V. Korhonen, Letchworth Garden City (GB); James R. Finnie, St. Albans (GB)

(73) Assignee: Xerox Corporation, Norwalk, CT (US)

( * ) Notice: Subject to any disclaimer, the term of this patent is extended or adjusted under 35 U.S.C. 154(b) by 476 days.

(21) Appl. No.: 11/370,511

(22) Filed: Mar. 7, 2006

(65) Prior Publication Data
US 2007/0211311 A1    Sep. 13, 2007

(51) Int. Cl.
H04N 1/04 (2006.01)
H04N 1/00 (2006.01)
(52) U.S. Cl. .................. 358/474; 358/406; 358/471; 358/496; 358/497
(58) Field of Classification Search ............. 358/496, 358/498, 497, 474, 471, 406, 504; 399/98, 399/364, 367, 379, 377, 345, 11; 382/312, 382/318, 319
See application file for complete search history.

(56) References Cited

U.S. PATENT DOCUMENTS

| | | | |
|---|---|---|---|
| 5,534,989 A | 7/1996 | Rubscha et al. | |
| 6,166,394 A | 12/2000 | Rubscha | |
| 6,350,072 B1 | 2/2002 | Nunes et al. | |
| 6,393,161 B1 | 5/2002 | Stevenson et al. | |
| 6,522,431 B1 | 2/2003 | Pitts et al. | |
| 6,795,219 B2 * | 9/2004 | Fujita | 358/496 |
| 2003/0090742 A1 * | 5/2003 | Fukuda et al. | 358/448 |

FOREIGN PATENT DOCUMENTS

JP      2004297443 A    * 10/2004

* cited by examiner

Primary Examiner—Cheukfan Lee
(74) Attorney, Agent, or Firm—Fay Sharpe LLP

(57) ABSTRACT

In a document handling system for moving documents for imaging over a transparent platen that is subject to contamination, and having a shared repositionable document illumination system that is normally positioned in a park position substantially spaced from this moving documents imaging platen area, wherein in response to lifting the document handling system and the activation of a diagnostics routine, which can be activated from detected image contamination, the repositionable document illumination system is automatically moved under the moving documents platen and activated to illuminate that platen area from underneath to illuminate the contamination thereon for cleaning.

7 Claims, 2 Drawing Sheets

CVT DOCUMENT SCANNER CONTAMINATION DIAGNOSTIC ROUTINE

By way of background, contamination of the imaging station of an automatic document feeder for a document scanner, in particular, the minor platen glass area over which document sheets are sequentially fed for scanning by a typical constant velocity transport (CVT), is a long-standing problem. When the CVT platen glass imaging area is contaminated, such as by dirt, paper lint, ink, toner, etc., the contaminants can cause visible lines or spots on the scanned image and any printed copies thereof. Yet in normal ambient light, the contaminants on the platen glass can be difficult to see even when the CVT document handling unit is inoperative and lifted up away from the platen glass by the user. It has been found that users and even service personnel can have difficulty in fully cleaning these imaging areas even when the user has tried to clean them, and it is believed that a contributory factor is the difficulty in seeing the dirt on the platen glass. The disclosed embodiments address these and other problems by a diagnostic routine that can be initiated automatically, by technical service personnel on site or remotely, or by a trained operator.

Recognition of the problems of imaging area contamination and partial electronic solutions are discussed in Xerox Corp. U.S. Pat. Nos. 6,393,161 B1 and 6,522,431 B1. An example of a typical CVT document feeding and imaging system is in Xerox Corp. U.S. Pat. Nos. 5,534,989, 6,166,394, or 6,350,072, incorporated by reference herein, although not limited thereto. As shown therein an automatic CVT moving documents feeder and imager may desirably be integrally combined with a large platen stationary document scanner for documents not desired to be fed through the CVT system, and the CVT system can use a small area of the same platen or a separate platen for its imaging station, and either can be lifted up to expose either of the two separate platen imaging areas. As described and shown therein, typically these units share the same scanning bar and scanning lamp unit, which moves under the CVT platen area during its CVT imaging operation, but moves over and parks on the opposite side of the large platen area provided for stationary document scanning whenever the platen cover, CVT unit, or both are opened, since that opening normally indicates that the user is planning to place a document for scanning on the large stationary document platen.

A specific feature of the specific embodiment disclosed herein is to provide a diagnostics system for a document imaging system including a document feeder for feeding documents sequentially through a moving documents imaging station in which said moving documents are imaged through a moving documents transparent platen area, and wherein said document imaging station has an adjacent and larger stationary documents transparent platen imaging area and a shared repositionable document illumination system that is normally positioned in a parking position substantially spaced from said moving documents transparent platen area other than for said imaging of said moving documents at said moving documents transparent platen area, and wherein said document feeder is liftable upwardly away from said moving documents transparent platen area to inactivate said document feeder and to expose said moving documents transparent platen area, wherein in response to said lifting of said document feeder and the activation of said diagnostics system said repositionable document illumination system is automatically positioned under said moving documents transparent platen area and activated to illuminate said moving documents transparent platen area from underneath said moving documents transparent platen area to provide for contamination cleaning assistance for said moving documents transparent platen area.

Further specific features disclosed in the embodiment herein, individually or in combination, include those wherein said diagnostics system is activated by a manual entry of a selectable platen cleaning diagnostics routine; and/or wherein said diagnostics system is activated by the automatic entry of a selected diagnostics routine activated by the optical detection of contaminants on said moving documents transparent platen area in the operation of said moving documents imaging station; and/or an activatable diagnostics method for a document imaging method including feeding documents with a document handling system sequentially through a moving documents imaging station and imaging said moving documents through a moving documents transparent platen area by a repositionable document imaging and illumination system, wherein said document handling system is liftable upwardly away from said moving documents transparent platen area, and wherein said repositionable document imaging and illumination system is normally repositioned to a parking position substantially spaced from said moving documents transparent platen area when said document handling system is lifted upwardly away from said moving documents transparent platen area, wherein in response to said activation of said diagnostics method together with said lifting of said document handling system upwardly away from said moving documents transparent platen area said repositionable document imaging and illumination system is automatically positioned under said moving documents transparent platen area and said illumination system thereof is activated to illuminate said moving documents transparent platen area from underneath said moving documents transparent platen area to provide contamination cleaning assistance for said moving documents transparent platen area; and/or wherein said diagnostics method is activated by a manual entry of a selectable platen cleaning diagnostics routine; and/or wherein said diagnostics method is automatically activated by the automatic entry of a selected diagnostics routine activated by the digital detection of image lines corresponding to contaminants on said moving documents transparent platen area during said moving documents imaging operation.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may, of course, vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

The term "reproduction apparatus" or "printer" as used herein broadly encompasses various printers, copiers or multifunction machines or systems, xerographic or otherwise, unless otherwise defined. The terms "sheet" "document" or "original" as used herein generally refer to a usually flimsy physical sheet of paper, plastic, or other suitable physical image bearing substrate.

As to specific components of the subject apparatus or methods, or alternatives therefor, it will be appreciated that, as is normally the case, some such components are known per se in other apparatus or applications, which may be additionally or alternatively used herein, including those from art cited herein. For example, it will be appreciated by respective engineers and others that many of the particular components, component actuations, or component drive systems illustrated herein are merely exemplary, and that the same novel motions and functions can be provided by many other known or readily available alternatives. All cited references, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the example below, and the claims. Thus, they will be better understood from this description of this specific embodiment, including the drawing figures (which are approximately to scale) wherein:

Figure 1:
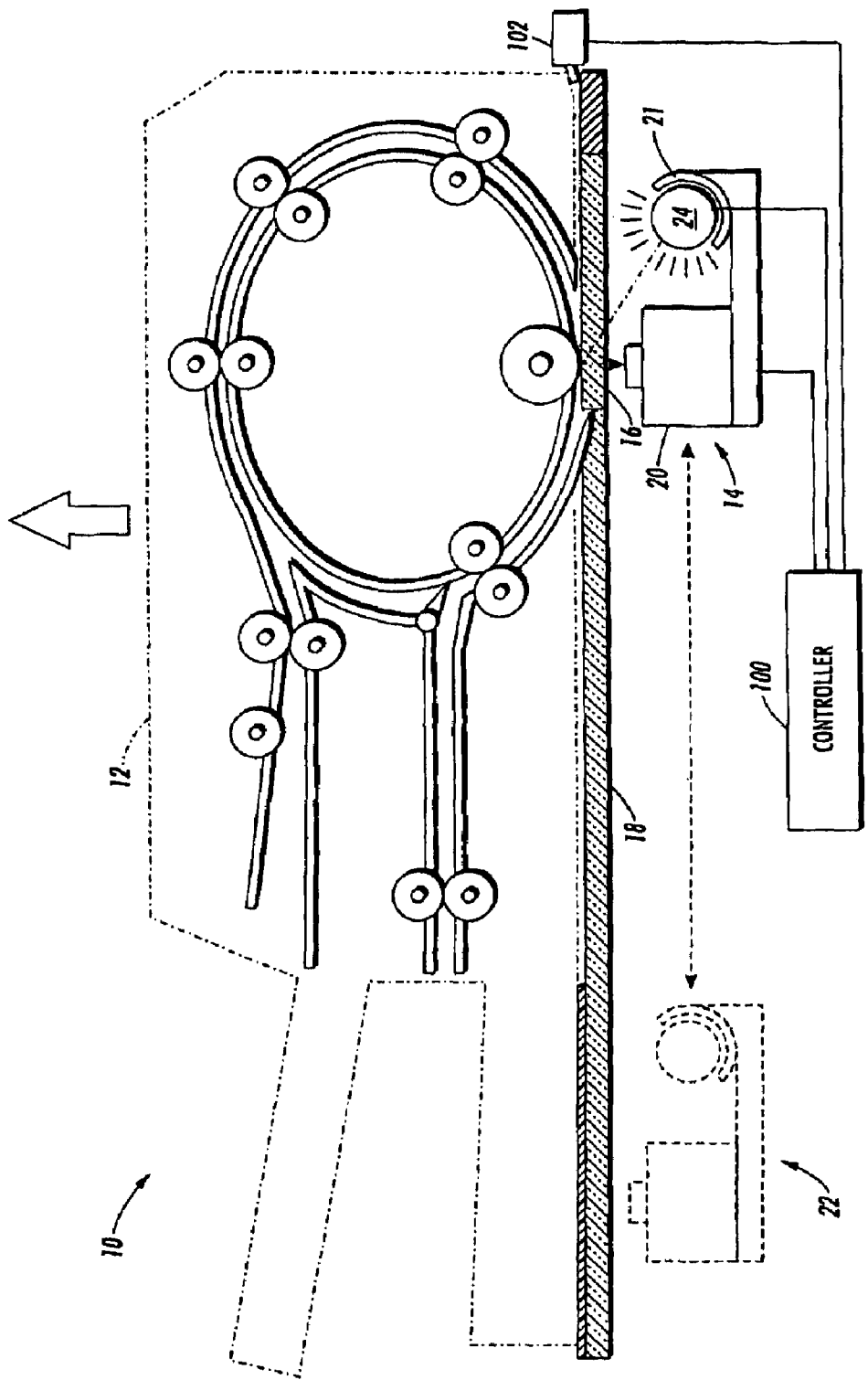
FIG. 1 is a schematic frontal view of an otherwise known and conventional dual mode document imaging system in which the subject diagnostics system and method may be incorporated as described.

Disclosed in this illustrated exemplary embodiment of FIG. 1 is the document feeding and imaging system of an otherwise well known dual document input digital reprographic machine 10 having a constant velocity transport (CVT) document feeding and moving documents scanning system unit 12. This system and unit 12 has a moving documents imaging station 14 with a small glass moving documents scanning platen 16. Such a dual document input machine 10 typically has a much larger adjacent stationary document copying platen 18, and shares its digital scanning document imager module 20 (with its integral illuminator 21) by moving it from its normal park position 22 at the start of scan side of the platen 18. That is, to reposition and park that imager module 20 under the small moving documents scanning platen 16 and illuminating that platen 16, but only during the imaging of moving documents by the CVT scanning system 12, and normally moving it back to its park position 22 when automatic document feeding and imaging is not selected to be done or the document handling unit 12 is lifted up away from its moving documents scanning platen 16. Conventionally, as noted, a programmable controller 100 controls all of these functions and can also store the programmed diagnostics routines described herein, and typically connects to a conventional operator GUI and keypad and to a lift indicator switch such as 102 for the liftable document handling unit 12.

Here this machine 10 additionally provides a diagnostics routine in which the customer (or service representative) can cause or direct the machine to move the shared document imager module 20 from its normal park position 22 over to the CVT document scanning position (imaging station 14) and to turn on the scan lamp 24 even though the CVT scanning system 12 is inoperative and lifted up away from its scanning platen area. With the imager module 20 in the CVT location, and its scan lamp 22 turned on, contamination on the CVT platen glass 16 (thumbprints, dirt, paper dust, etc.) is much more visible, and hence can be more easily cleaned by the customer, potentially preventing a service call, and/or providing more efficient and effective service calls.

That is, while the CVT is inoperative and its platen glass 16 area is exposed by lifting the CVT unit as shown, for example, in the above-cited U.S. Pat. No. 5,534,989, FIG. 5, the document illumination lamp or lamps 24 (which, as is known in the art, may be an array of LEDs in the imaging scanning bar itself in some cases) is retained or moved over to the proximity of the CVT platen glass 16 and turned on to illuminate that moving documents imaging area 16 from underneath. Note that this scanning illumination 22 is normally only turned on during an actual scanning operation, but that is overridden by the institution of the diagnostics routine. This bright illumination from the platen glass makes contamination on the glass easy to see and thus enables customers to clean it effectively and efficiently.

A study of service calls on an existing product discovered that absent the subject diagnostic assistance that users who had been trying to fully clean the platen glass had fairly often failed. In many cases it was noted that it was very difficult for machine users to actually see all the dirt on the platen glass, and what is difficult to see is difficult to clean. When the CVT platen glass 16 is contaminated, this can result in contamination lines on the image copies. Yet in normal ambient light, this contamination on the glass is difficult to see. The disclosed system makes the dirt on the CVT glass clearly visible and therefore enables customers to see, and thus efficiently clean, the CVT platen glass.

Figure 2:
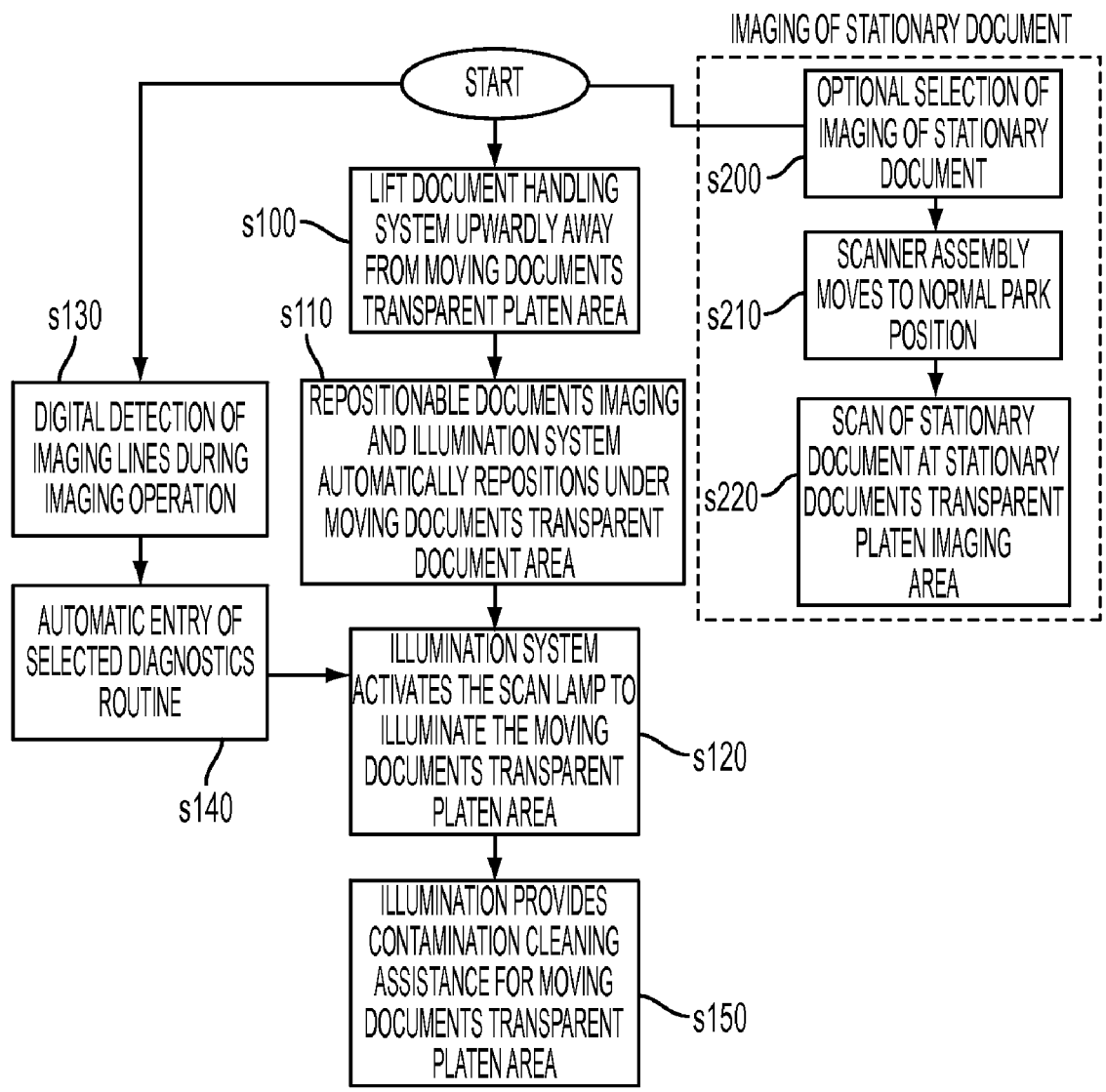
FIG. 2 is a flow chart of a method of utilizing an exemplary embodiment of the diagnostics system of the disclosure.

Different diagnostic routines are possible, such as the following, which are illustrated in FIG. 2:

A) An automated always ready to clean system:

Whenever the customer lifts the CVT unit 12 (step S100), the scanner array assembly (including the illumination lamp) is automatically retained at the area near the CVT glass (step S110) instead of moving to the park position and the scanning illumination light is automatically turned on (step S120). If the customer selects the imaging of a stationary document (step S200) on the stationary document platen 18, the scanner assembly moves back over to its normal park position (step S210) to begin to scan under the stationary document (step S220) normally.

B) An automated system instituting a platen cleaning diagnostics operation upon identification on lines on the images:

An automated system to automatically identify dirt on the platen glass can be provided. For example, by the CVT unit 12 periodically starting image scanning slightly before the edge of the moving document sheet reaches the imaging station 14, and the system imaging software then analyzing this image from this pre-sheet area, looking for any lines. If lines are optically and/or digitally detected as present (step S130), the system would display and/or provide an option in the GUI for the customer to clean the glass, and automatically, or upon the users confirmation agreement (by manual input via the GUI) move the scanner array over under CVT glass to illuminate this automatically detected platen contamination (step S120).

C) A cleaning diagnostics operation only upon request:

If the machine user notices lines on the scanned images or their print copies, he or she could check an online database, a machine GUI "help" display, or contact a customer service center, to get advice on how to select an appropriate CVT platen glass clean-up diagnostics mode. After selecting this mode (see below), the scanner array would be positioned the appropriate area near the CVT glass and its illumination lamp switched on. The set-up for this mode could be software selectable, for example, displayed as an additional option in the image adjustments area of the machines existing graphic user interface (GUI), or selected by a specifically designated manually selected key sequence selecting this diagnostic routine on the machine keypad.

In conclusion, the proposed system makes contaminants on the CVT glass much more clearly visible and therefore enables customers to see and thus successfully clean the CVT glass more effectively (step S150), to thus remove the related image defects. Increasing the customers' platen cleaning success rate reduces the need for unscheduled maintenance visits and their costs. Also, since the proposed system can utilize the existing hardware and enable the diagnostics routine using software control only, there is no required UMO increase.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A diagnostics system for a document imaging system including a document feeder for feeding documents sequentially through a moving documents imaging station in which said moving documents are imaged through a moving documents transparent platen area, and
   wherein said document imaging station has an adjacent and larger documents transparent platen imaging area and a shared repositionable document illumination system that is normally positioned substantially under said moving documents transparent platen area for said imaging of said moving documents at said moving documents transparent platen area, and
   wherein said document feeder is liftable upwardly away from said moving documents transparent platen area to inactivate said document feeder and to expose said moving documents transparent platen area,
   wherein in response to said lifting of said document feeder an illumination lamp of said repositionable document illumination system is automatically retained under said moving documents transparent platen area and automatically illuminates said moving documents transparent platen area from underneath said moving documents transparent platen area to provide for contamination cleaning assistance for said moving documents transparent platen area;
   wherein in response to selection of an imaging operation for a stationary document, the illumination system moves to a park position substantially spaced from said moving documents transparent platen area for scanning the stationary document.

2. The diagnostics system for a document imaging system of claim 1, wherein said diagnostics system is activated by a manual entry of a selectable platen cleaning diagnostics routine.

3. An activatable diagnostics method for a document imaging method including feeding documents with a document handling system sequentially through a moving documents imaging station and imaging said moving documents through a moving documents transparent platen area by a repositionable document imaging and illumination system,
   wherein said document handling system is liftable upwardly away from said moving documents transparent platen area,
   and wherein said repositionable document imaging and illumination system is normally positioned under said moving documents transparent platen area when said document handling system is lifted upwardly away from said moving documents transparent platen area,
   wherein in response to said lifting of said document handling system upwardly away from said moving documents transparent platen area said repositionable document imaging and illumination system is automatically retained under said moving documents transparent platen area and said illumination system thereof is activated to illuminate said moving documents transparent platen area from underneath said moving documents transparent platen area to provide contamination cleaning assistance for said moving documents transparent platen area
   wherein in response to activation of an imaging operation for a stationary document, the illumination system moves to a position substantially spaced from said moving documents at said moving documents transparent platen area for imaging the stationary document.

4. The activatable diagnostics method for a document imaging method of claim 3, wherein said diagnostics method is activated by a manual entry of a selectable platen cleaning diagnostics routine.

5. The activatable diagnostics method for a document imaging method of claim 3, wherein said diagnostics method is automatically activated by the automatic entry of a selected diagnostics routine activated by the digital detection of image lines corresponding to contaminants on said moving documents transparent platen area during said moving documents imaging operation.

6. A diagnostic method for a document imaging apparatus including feeding documents with a document handling system sequentially through a moving documents imaging station and imaging said moving documents through a moving documents transparent platen area by a repositionable document imaging and illumination system, the method comprising:
   lifting a document feeder;
   in response to lifting of the document feeder, automatically retaining the document imaging and illumination system at a first home position situated under a moving documents platen area;
   in response to retaining the document imaging and illumination system at the first home position, automatically activating an illuminant of the document imaging and illumination system to illuminate the moving documents platen area.

7. The diagnostics method of claim 6, further including an imaging mode to override a diagnostic mode of steps (a) to (d), the imaging mode including:
   activating an imaging operation for a stationary document;
   moving the document imaging and illumination system from the first home position to a second position opposite the moving documents platen area under a stationary documents platen area; and,
   imaging the stationary document with the document imaging and illumination system.

* * * * *